United States Patent [19]
Corsini et al.

[11] Patent Number: 5,796,764
[45] Date of Patent: Aug. 18, 1998

[54] RARE-EARTH DOPED LITHIUM NIOBATE DBR LASER

[75] Inventors: Raffaele Corsini, Villadossola; Dietmar Hiller, Milan, both of Italy

[73] Assignee: Pirelli Cavi S.p.A., Italy

[21] Appl. No.: 760,735

[22] Filed: Dec. 5, 1996

[30] Foreign Application Priority Data

Jan. 12, 1996 [EP] European Pat. Off. ............ 96830008

[51] Int. Cl.[6] ................ H01S 3/30; G02B 6/34; H04J 14/02
[52] U.S. Cl. ................ 372/6; 372/23; 372/26; 372/28; 372/69; 372/70; 372/96; 372/98; 372/102; 385/37; 359/115; 359/130
[58] Field of Search ............ 372/6, 7, 18, 19, 372/23, 26, 28, 43, 49, 50, 69, 70, 92, 96, 98, 102; 385/37; 359/115, 130, 134

[56] References Cited

U.S. PATENT DOCUMENTS

| | | | |
|---|---|---|---|
| 4,787,086 | 11/1988 | Dentai et al. | 372/19 |
| 4,812,005 | 3/1989 | Heywang | 372/6 X |
| 5,295,209 | 3/1994 | Huber | 385/37 |
| 5,305,336 | 4/1994 | Adar et al. | 372/18 |
| 5,450,427 | 9/1995 | Fermann et al. | 372/18 |
| 5,485,481 | 1/1996 | Ventrudo et al. | 372/6 |

FOREIGN PATENT DOCUMENTS

WO-A 9422187 9/1994 WIPO .................. 372/18 X

OTHER PUBLICATIONS

Applied Physics Letters — vol. 67, No. 5, Jul. 31, 1995.
Electronic Letters — vol. 31, No. 7 — Mar. 30, 1995, pp. 551–552.
Optics Letters, vol. 20, No. 6 Mar. 15, 1995 pp. 596–598.

*Primary Examiner*—Brian Healy
*Attorney, Agent, or Firm*—Brooks Haidt Haffner & Delahunty

[57] ABSTRACT

A rare-earth doped, lithium niobate, diffusion Bragg reflector laser having a simplified structure and improved efficiency is disclosed. The laser has a pump source, a wavelength division multiplexer, a substrate of lithium niobate doped with at least one rare earth element and having a feedback element, and a grating reflector. The grating reflector is formed from portions of an optical fibre and abuts one end of the doped substrate, such that the grating reflector and the feedback element of the doped substrate form a cavity for the laser. The doped substrate may include phase or amplitude modulators for FM or AM mode-locking operation.

35 Claims, 5 Drawing Sheets

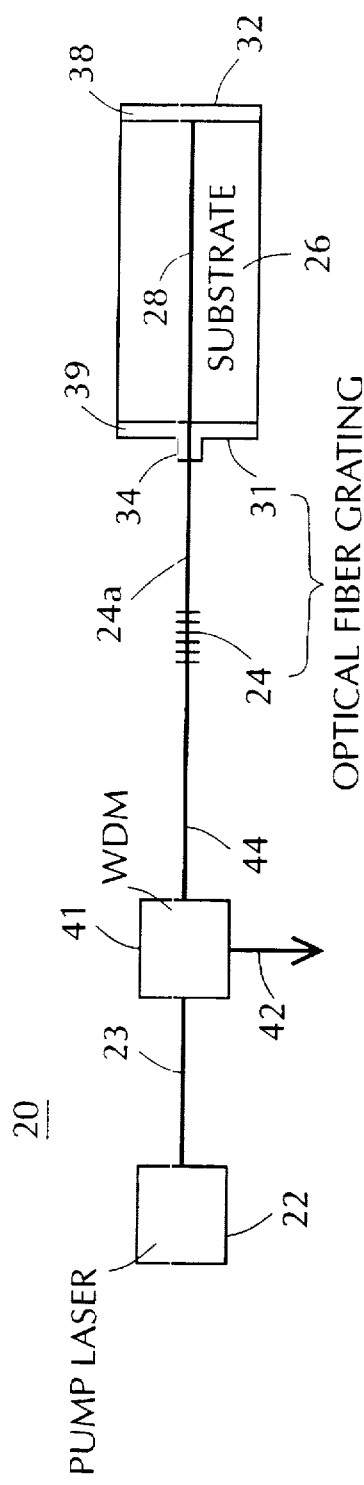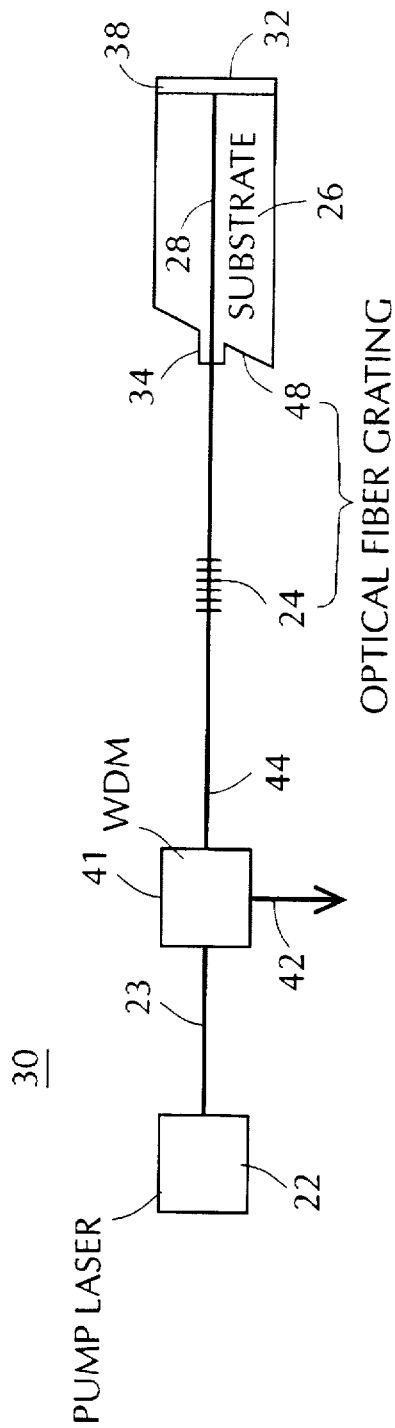

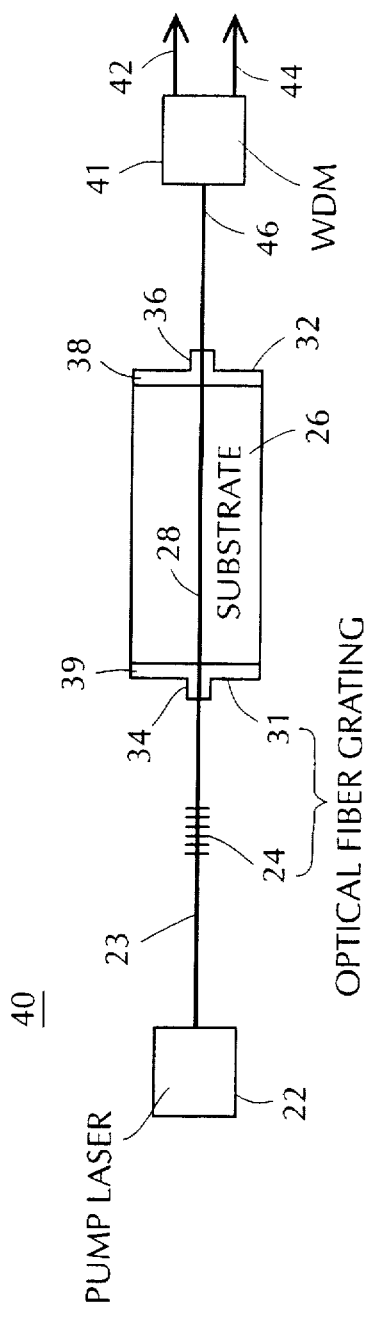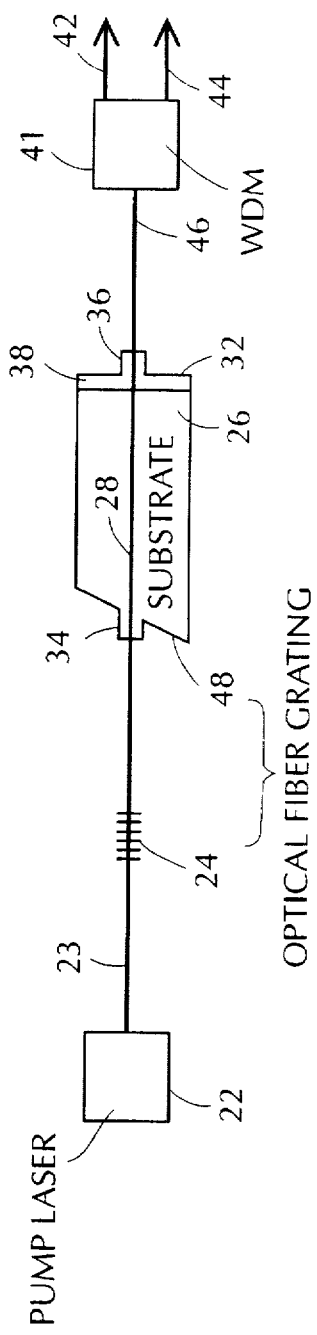

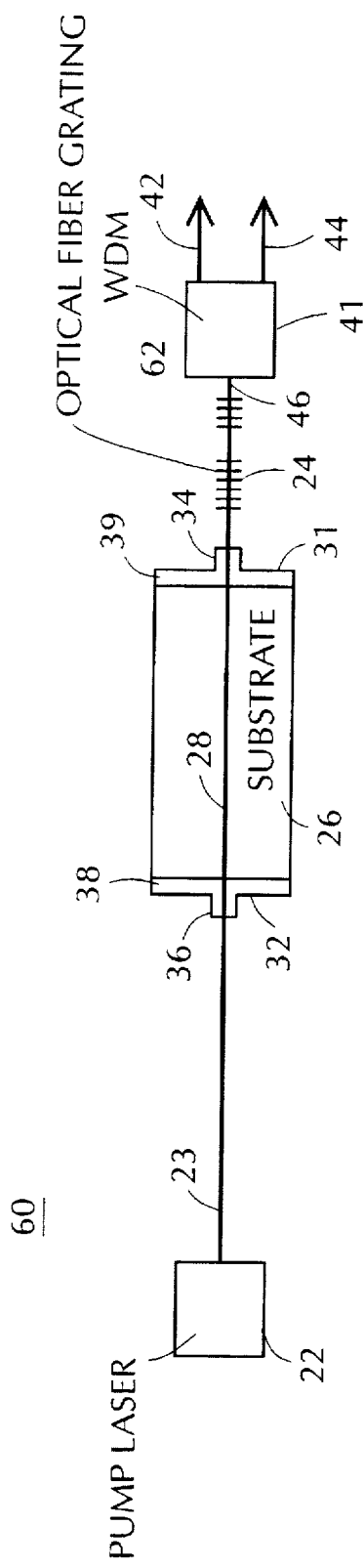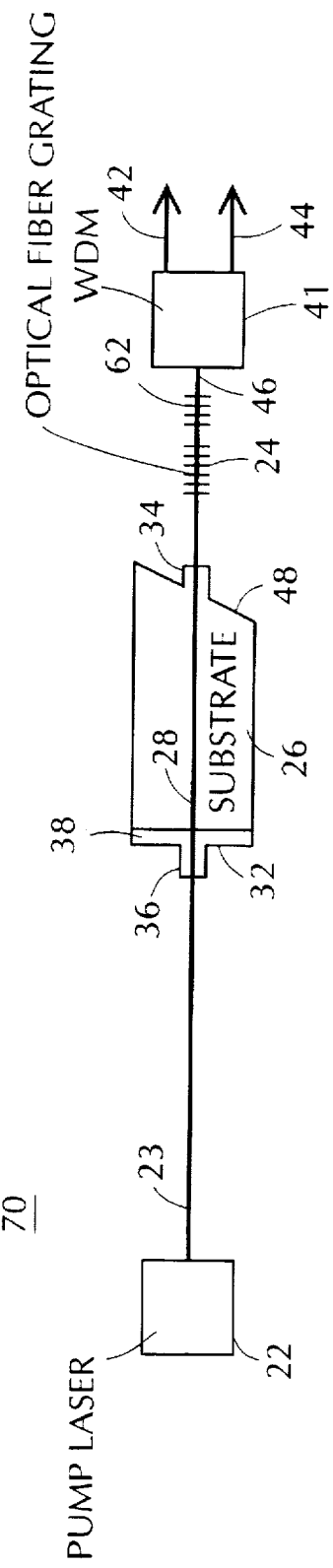

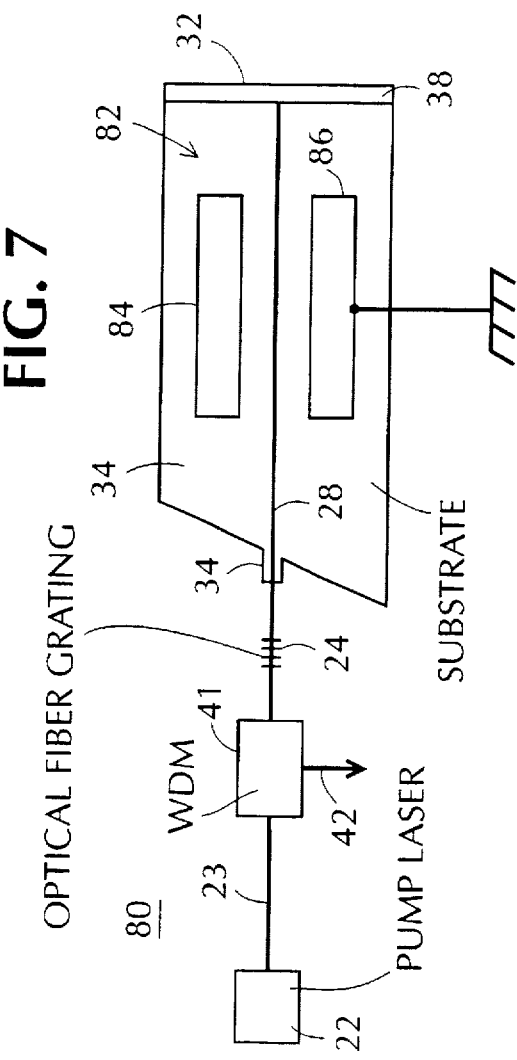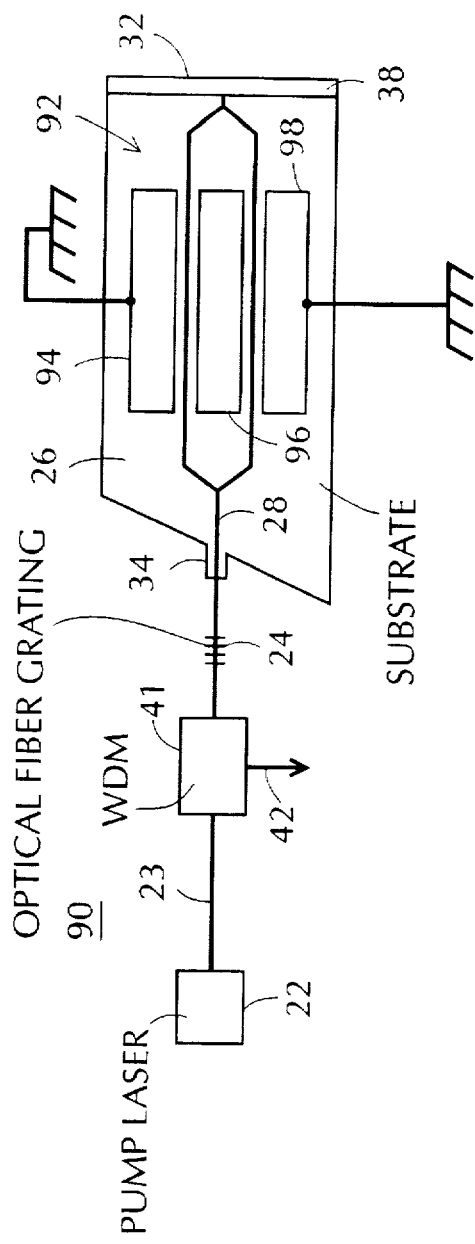

RARE-EARTH DOPED LITHIUM NIOBATE DBR LASER

FIELD OF THE INVENTION

The present invention relates generally to lasers using distributed Bragg reflectors, and more particularly to rare-earth doped, lithium niobate, distributed Bragg reflector lasers.

BACKGROUND OF THE INVENTION

The importance of lasers in the field of optical communications has risen dramatically.

In general, lasers require an optical resonator to force emitted light to make several passes through a gain active region.

This resonator, or laser cavity, should provide efficient lasing without adding unwanted reflections or causing an increased threshold power to initiate lasing. Semiconductor lasers typically use a Fabry-Perot resonator that comprises parallel alignment of reflecting surfaces on the front and rear of the active region to define the resonator.

Distributed feedback lasers and distributed Bragg reflector lasers avoid the need for concentrated reflecting surfaces at the ends of the laser medium by distributing the reflecting surfaces.

Both methods use a corrugated interface to distribute reflections across an area. Distributed feedback lasers use a corrugated interface across the lasing medium, while Distributed Bragg Reflector (DBR) lasers distribute the reflecting surface outside the lasing medium.

In a DBR laser, a corrugated interface, or a grating, provides reflection for light at a particular wavelength $\lambda$.

The grating reflects the wavelength $\lambda$ according to a grating period $\Lambda$ and an effective index of the waveguide $n_{\mathit{eff}}$ on which the grating is made by the following equation:

$$\lambda = 2 * n_{\mathit{eff}} * \Lambda.$$

Consequently, the grating acts as a partially reflecting, wavelength selective mirror. By using a grating as one of the mirrors in a laser cavity, the laser can operate at the wavelength $\lambda$ that satisfies the above equation.

WO94/122187 discloses a laser comprising first and second feedback elements defining a laser cavity and a gain medium within the laser cavity, in which the second feedback element is wavelength selective.

Preferably the selective feedback element comprises a grating in an optical fibre. Preferably the gain medium of the laser comprises a semiconductor laser diode; alternatively, the gain medium may comprise a rare earth doped fibre. In case the gain medium is a semiconductor laser diode, however, a lens coupling is required between the semiconductor and the optical fibre, in order to have a sufficient coupling efficiency, and, because of the nature of the semiconductor, many interfaces are present within the laser cavity, which require specific anti-reflection coatings to avoid the formation of additional laser cavities.

This is limiting the convenience of using fiber gratings as feedback means in a bulk gain medium such as a semiconductor laser.

In case the gain medium is a rare earth doped fibre, the Applicant is observing that, if the cavity is defined by two fiber gratings, it is very difficult to find two gratings having the same feedback wavelength to provide a laser with satisfactory performances and one of them should be tuned in wavelength, for example by temperature control means.

U.S. Pat. No. 5,473,722 discloses a laser in rare earth doped lithium niobate crystal waveguide structure, in which the rare earth doping region is bounded at one end by a surface relief grid (grating).

J. Söchtig et al., in Proc. SPIE Conf. on Nanofabrication and Device Integration, vol. 2213 (1994), published an article having title: "Grating reflectors for erbiumdoped lithium niobate waveguide lasers".

As explained in the Söchtig et al. article, the researchers developed a fabrication technique for producing DFB/DBR-grating structures in Er-doped Ti:LiNbO$_3$ waveguide lasers using reactive ion etching with SF$_6$ gas as the dry etching technique.

This manufacturing technique for rare-earth doped Ti:LiNbO$_3$ DBR lasers suffers from difficulty in making a grating directly on the lithium niobate substrate. The hardness of the substrate material complicates the etching process for the grating. Several layers of protective material must be deposited on the substrate, and several etching processes must be performed. Also, the etching process does not show good selectivity between the substrate and the protective mask.

Another drawback of gratings formed directly on LiNbO$_3$ substrates is the overall cavity loss. The imperfect fabrication process for the corrugated gratings and the roughening of the waveguide by etching can cause incoherent scattering, which is a source of background loss.

U.S. Pat. No. 5,450,427 discloses a mode-locked laser in which the laser source is an erbium fibre laser, though the system is said to be able to work equally well with other types of waveguide lasers, such as doped LiNbO$_3$ waveguides, or bulk solid state lasers, or semiconductor lasers. In the patent the fibre grating operates as dispersive element in the cavity and is chirped; the operation wavelength of the laser is not defined by the Bragg resonance of the grating but by the loss conditions of the cavity.

The previous arrangements have not focused on simplifying the laser structure and minimizing noise reflections within the laser cavity. Unwanted cavity reflections or losses of the oscillated signal within the laser cavity degrade laser performance. Moreover, attenuation or degradation of the pump and signal within the laser cavity demands a related amount of increased pumping power from the laser diode to exceed the threshold power for lasing. For example, in a laser configuration as shown in FIG. 1 of the above cited article of J. Söchtig et al., in Proc. SPIE vol. 2213, the grating does not reflect pump power, thereby limiting the pump light to a single pass through the laser cavity.

A more powerful pump source increases the operational costs of the laser for a lower efficiency.

Overall, known rare-earth doped, lithium niobate DBR lasers either suffer from difficult and detrimental etching processes when working directly with the lithium niobate crystal or suffer from increased reflections and signal attenuation within the cavity.

In light of the foregoing, a need exists for a rare-earth doped, lithium niobate DBR laser that does not require etching of a lithium niobate substrate. A further need exists for a rare-earth doped, lithium niobate DBR laser that has minimal cavity reflections and minimal pump signal and emission signal attenuation within the laser cavity.

BRIEF DESCRIPTION OF THE INVENTION

According to one aspect, the invention comprises a laser, comprising a substrate doped with a lasing material, the doped substrate having first and second ends and including a waveguide for passing a pumping light and a stimulated emission signal between the ends, the first end including a feedback element for reflecting at least a portion of the emission signal toward the second end; and a grating reflector having an input optically coupled with the waveguide at the second end of the doped substrate and an output, the grating reflector and the feedback element defining a laser cavity including the doped substrate, characterized in that the grating reflector is formed from an optical fibre portion and reflects at least a portion of the emission signal toward the first end of the doped substrate.

Preferably, the laser may further comprise a pump source coupled to the output of the grating reflector, the pump source driving pumping light through the grating reflector and then into the doped substrate.

Preferably, the laser may further comprise optical separation means interposed between the pump source and the grating reflector, separating the emission signal from other signals received from the pump source and the grating reflector; in particular, said optical separation means is a wavelength division multiplexer or an optical circulator.

In alternative, the laser may comprise a wavelength division multiplexer optically coupled to the first end of the doped substrate, separating the emission signal from other signals received from the feedback element.

Preferably, said substrate is an electro-optic material; more preferably, said substrate is lithium niobate.

In particular, said lasing material includes at least a rare earth.

In a preferred embodiment, said feedback element reflects at least a portion of both the emission signal and the pumping light toward the second end of the substrate. Preferably, the laser further comprises a thermally-stable package housing at least the doped substrate and the grating reflector.

Preferably, the optical connection between the grating reflector and the doped substrate causes a loss to the pumping light of less than 1 dB.

In a particular embodiment the feedback element comprises a plurality of layers of dielectric material deposited on the first end of the doped and the second end of the doped substrate includes an antireflective coating.

In a preferred embodiment, the second end of the doped substrate is polished at an angle.

In an alternative embodiment, the laser according to the invention comprises a pump source coupled to the first end of the doped substrate, the pump source driving pumping light through the feedback element, the doped substrate, and then to the grating reflector.

Preferably, said laser further comprises a wavelength division multiplexer coupled to the output of the grating reflector, the wavelength division multiplexer separating the emission signal from other signals received from the grating reflector.

In a particular embodiment of the laser of the invention, the emission signal corresponds to single-mode, continuous-wave operation for the laser.

Preferably, the grating reflector has a bandwidth less than 1 nm.

In a particular embodiment the laser further comprises a phase modulator integrated in the doped substrate, the phase modulator providing FM mode-locking operation for the laser; in alternative, the laser further comprises an amplitude modulator integrated in the doped substrate, the amplitude modulator providing AM mode-locking operation for the laser.

In a further aspect, the present invention refers to a laser, comprising:

a pump source for generating a pumping light;

a substrate of lithium niobate doped with at least one rare earth element, the doped substrate including a waveguide for passing the pumping light and a stimulated emission signal through the doped substrate;

first means, contacting the waveguide, for reflecting a first group of selected wavelengths passing from the waveguide back through the waveguide, the first group including at least the emission signal;

second means, contacting the waveguide, for reflecting a second group of selected wavelengths passing from the waveguide back through the waveguide, the doped substrate being positioned between the first and second reflecting means, the second group including at least the pumping signal; and a grating reflector having an input coupled to the second reflecting means and an output, the grating reflector being formed from portions of an optical fibre and reflecting at least the emission signal passing from the second reflecting means back toward the waveguide, the grating reflector and the first reflecting means defining a cavity for the laser.

Preferably, the laser further comprises a thermally-stable package housing at least the doped substrate and the grating reflector.

Preferably, the grating reflector is positioned between the second wavelength-selective reflector and the doped substrate, the input of the grating reflector abutting the second end of the doped substrate. In an embodiment, the laser further comprises a wavelength division multiplexer coupled to the second wavelength-selective reflector, the wavelength division multiplexer separating the emission signal from other signals received from the feedback element.

In an embodiment the second wavelength-selective reflector is positioned between the grating reflector and the doped and is optically coupled to the second end of the doped substrate. In particular, the laser further comprises a wavelength division multiplexer coupled to the output of the grating reflector, separating the emission signal from other signals received from the feedback element.

In an embodiment the laser further comprises a phase modulator integrated in the doped substrate, providing FM mode-locking operation for the laser, or it further comprises an amplitude modulator integrated in the doped substrate, providing AM mode-locking operation for the laser.

According to a further aspect, the present invention concerns a laser, comprising:

a pump source for generating a pumping light;

a substrate of lithium niobate doped with at least one rare earth element, the doped substrate including a waveguide for passing the pumping light and a stimulated emission signal through the doped substrate;

a first wavelength-selective reflector contacting the waveguide for reflecting a first group of selected wavelengths passing from the waveguide back through the waveguide, the first group including at least the emission signal;

a second wavelength-selective reflector contacting the waveguide for reflecting a second group of selected wavelengths passing from the waveguide back through the waveguide, the doped substrate being positioned between the first and second wavelength-selective reflectors, the second group including at least the pumping signal;

a first grating reflector having an input coupled to the second wavelength-selective reflector and an output; and a second grating reflector having an input coupled to the output of the first grating reflector, the first and second grating reflectors being formed from portions of optical fibres, one of the first and second grating reflectors reflecting the emission signal passing from the second wavelength-selective reflector back toward the waveguide, another of the first and second grating reflectors reflecting the pumping signal passing from the second wavelength-selective reflector back toward the waveguide, the first wavelength-selective reflector and said one of the first and second grating reflectors defining a cavity for the laser.

Preferably, the grating reflector has a bandwidth less than 1 nm.

Said laser may further comprise a phase modulator integrated in the doped substrate, providing FM mode-locking operation for the laser, or may further comprise an amplitude modulator integrated in the doped substrate, providing AM mode-locking operation for the laser.

It is understood that both the foregoing general description and the following detailed description are exemplary and explanatory and are intended to provide further explanation of the invention as claimed.

BRIEF DESCRIPTION OF THE DRAWINGS

The accompanying drawings, which are incorporated in and constitute a part of this specification, illustrate several embodiments of the invention and together with the description serve to explain the principles of the invention. In the drawings, FIG. 1 is a first schematic drawing of a rare-earth doped, lithium niobate DBR laser according to a first embodiment of the present invention;

FIG. 2 is a second schematic drawing of a rare-earth doped, lithium niobate DBR laser according to the first embodiment of the present invention;

FIG. 3 is a first schematic drawing of a rare-earth doped, lithium niobate DBR laser according to a second embodiment of the present invention;

FIG. 4 is a second schematic drawing of a rare-earth doped, lithium niobate DBR laser according to the second embodiment of the present invention;

FIG. 5 is a first schematic drawing of a rare-earth doped, lithium niobate DBR laser according to a third embodiment of the present invention;

FIG. 6 is a second schematic drawing of a rare-earth doped, lithium niobate DBR laser according to the third embodiment of the present invention;

FIG. 7 is a schematic drawing of the first embodiment of the rare-earth doped, lithium niobate DBR laser of the present invention including a phase modulator;

FIG. 8 is a schematic drawing of the first embodiment of the rare-earth doped, lithium niobate DBR laser of the present invention including an amplitude modulator.

DETAILED DESCRIPTION OF PREFERRED EMBODIMENTS

Figure 9:
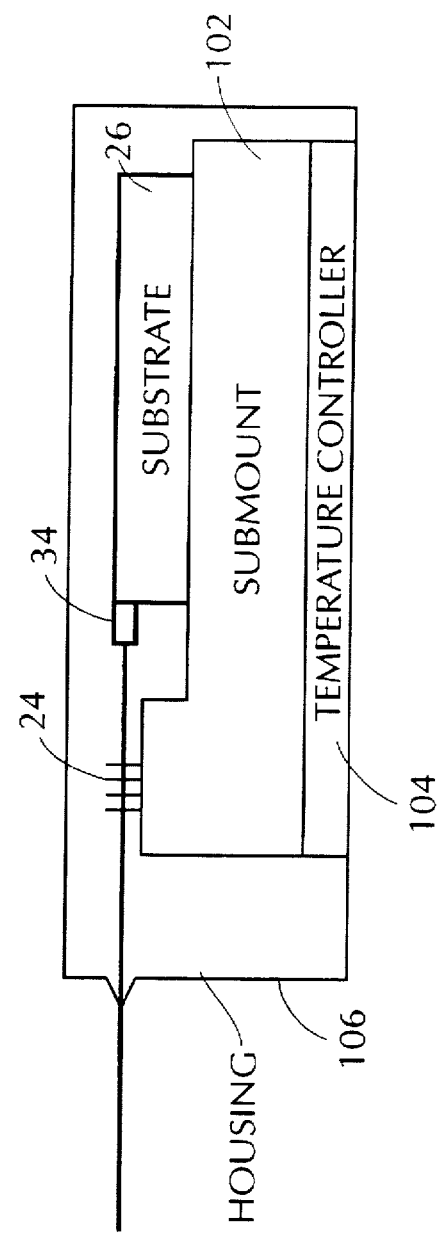
FIG. 9 is a side view of a housing package for the rare-earth doped, lithium niobate DBR laser of the present invention.

Reference will now be made in detail to the presently preferred embodiments of the invention, examples of which are illustrated in the accompanying drawings.

Wherever possible, the same reference numbers will be used throughout the drawings to refer to the same or like parts.

In accordance with the present invention, a laser comprises a substrate of lithium niobate doped with at least one rare earth element, the doped substrate having first and second ends, the first end including a feedback element; a waveguide within the doped substrate; and a grating reflector having an input affixed directly to the second end of the doped substrate and an output, the grating reflector being formed from portions of an optical fibre and reflecting at least the emission signal toward the first end of the doped substrate, the grating reflector and the feedback element defining the doped substrate and the optical fibre as a cavity for the laser.

The exemplary embodiment of the laser of the present invention is shown in FIG. 1 and is designated generally by reference numeral 20.

As herein embodied, laser diode 22 serves as a source of pumping light energy for the laser generally referred to at 20. The laser diode 22 feeds the pumping light through an optical waveguide 23, a wavelength division multiplexer (briefly called WDM in the foregoing) 41, a second optical waveguide 44, a grating reflector 24, and into waveguide 28 within a doped substrate 26.

The laser diode 22 may be of any type readily available in the marketplace based on the parameters of the overall DBR laser discussed herein.

A suitable laser is 1480 nm Laser Diode Module type FOL1402PAZ-P, Type 4, produced by THE FURUKAWA ELECTRIC Co. Ltd, Tokyo (JP).

As readily known in the art, the required output power of the diode laser depends on, among other factors, the threshold pumping power required to generate lasing within the laser cavity. In addition, the optimal operating wavelength of the pump 22 depends on the gain medium within the optical resonator.

In case of erbium as dopant, pump 22 operates preferably at 1480 nm. Laser 20 of FIG. 1 further includes a wavelength division multiplexer (WDM) 41. Laser diode 22 provides optical energy along an optical fibre 23 to WDM 41.

The WDM is a device, known in the art, which combines or separates selected wavelengths from multiple input signals.

A suitable WDM is, for example, model FWDM 1480/1550 Filter Wavelength Division Multiplexer, manufactured by E-TEK DYNAMICS Inc, San Jose, Calif. (USA).

WDM 41 serves to separate the desired emission signal received on line 44 from the pumping signal introduced by the laser source 22 on line 23 and to output the result on line 42.

As a result, output 42 from the WDM 41 functions as an output from the overall laser 20 in the configuration of FIG. 1.

With respect to the pumping signal, WDM 41 simply passes the pumping energy from line 23 to line 44 toward doped substrate 26 with minimal attenuation.

The laser 20 may use an optical circulator instead of the wavelength division multiplexer to extract the emission signal from the laser. An optical circulator is a passive optical component, generally provided with three or four ports disposed in an orderly sequence, unidirectionally transmitting the input radiation from each of the ports towards one alone of the other ports and more particularly towards the next adjacent port in the sequence. The optical circulators are commercially available components. Adapted for use in the present invention are for example model CR1500, manufactured by JDS FITEL Inc., 570 Heston Drive, Nepean, Ontario (Calif.), or model PIFC-100 manufactured by E-TEK DYNAMICS Inc.

Both the optical circulator and the WDM are preferably connected to the optical circuit by polarization maintaining fibers. Also the grating can be made in a polarization mantaining fiber. If polarization maintaining fibers were not used, a polarization controller should be used.

The substrate 26 comprises a crystal of lithium niobate ($LiNbO_3$) doped with at least one rare earth element, for example erbium or neodymium. For an erbium-doped lithium niobate crystal ($Er:LiNbO_3$), the laser diode 22, as mentioned, provides a pumping energy that centers preferably on a wavelength of 1480 nm, which is a characteristic excitation wavelength for erbium doped lithium niobate. As known to one of ordinary skill in the art, the use of other rare earth dopants for the $LiNbO_3$ crystal dictates the wavelength of the pumping signal generated by the laser diode 22.

As shown in FIG. 1, the doped substrate 26 includes two end faces 31 and 32. A waveguide 28 formed within the lithium niobate crystal passes the pumping signal generated by the laser diode 22 through the doped substrate 26, between the substrate end faces 31 and 32.

Preferably, the lithium niobate substrate includes a waveguide which is single mode both at pump and signal wavelengths.

One end face 31 of the doped substrate 26 includes an antireflective layer 39 formed thereon. This layer 39 minimizes reflections otherwise caused by the interface of the substrate end 31 with an optically conductive medium. Preferably, the antireflective layer 39 comprises multiple alternating layers of $SiO_2$ and $TiO_2$ applied to the polished endface 31 of the lithium niobate crystal 26. Preferably, the antireflective layer 39 may comprise two layers of $SiO_2$ of about 73 and 78 nm thickness respectively and one layer of $TiO_2$ of about 74 nm thickness interposed therebetween.

The layers may be applied by electron beam evaporation.

The laser of the preferred embodiment further includes a feedback element 38 positioned on the other end 32 of the doped substrate 26.

The feedback element 38 has reflective characteristics such that it will reflect selected optical wavelengths travelling through the waveguide 28 from substrate end 31 back in the direction of substrate end 31.

The feedback element 38 serves to reflect at least the emission signal, and preferably the emission signal and the pumping signal, that travels through the waveguide 28 back through the doped substrate.

The feedback element 38 is preferably formed directly on the end 32 of the doped substrate 26. This integral structure with the substrate 26 eliminates reflections that otherwise would arise with the feedback element 38 coupled to the substrate 26 via an optical connecting device, such as an optical fibre.

Typically, the feedback element 38 is a broadband mirror with a reflectivity centered around a wavelength within the emission wavelength range, which is about 1530–1610 nm for an erbium-doped lithium niobate crystal (for example, about 1550 nm).

For this construction, a mirror which has, for example, approximately 92% reflectivity at 1550 nm is made of eleven alternating layers of $SiO_2$ and $TiO_2$ of about 262 nm and 183 nm thickness respectively.

Otherwise, the feedback element might be a wavelength-selective device, i.e. a device which has, for example, a reflectivity of 99% at the emission wavelength of 1550 nm and a reflectivity of 10% a pumping wavelength of 1480 nm.

Such a wavelength-selective device may be made of 23 alternating layers of $SiO_2$ and $TiO_2$ of about 290 nm and 202 nm thickness respectively.

In this case, however, only the signal would be reflected, and a single pump pass would be provided.

Although an integral formation with the substrate 26 for the feedback element 38 is preferred, the present invention might also contemplate the positioning of the reflecting element 38 spaced apart from the substrate 26 and connected to the substrate end face 32 with a high coupling efficiency.

In accordance with the present invention, the laser of the preferred embodiment further includes a grating reflector 24 having an input coupled to end 31 of the doped substrate 26.

The grating is preferably formed in an optical fibre portion, according to techniques known in the field.

Gratings adapted for use in the present invention are, for example, the so-called Bragg-grating waveguide filters.

They reflect the radiation in a narrow wavelength band and transmit the radiation outside of this band. They consist of a portion of an optical fibre along which the refractive index exhibits a periodic variation: if the signal portions reflected at each index change are in phase with each other, a constructive interference occurs and the incident signal is reflected.

The constructive-interference condition, corresponding to the reflection maximum, is expressed by the equation $2*\Lambda = \lambda/n_{ef}$, wherein $\Lambda$ is the pitch of the grating formed by the refractive index variations, $\lambda$ is the wavelength of the incident radiation and $n_{ef}$ the refractive index of the optical waveguide core. The described device is described in the related literature as Bragg grating.

The periodic variation in the refractive index in the fiber can be achieved by known techniques, for example by exposing an optical fibre portion devoid of the protective coating to the interference fringes formed by an intense UV beam (such as that generated by an excimer laser, a frequency-doubled argon laser or a frequency-quadrupled Nd:YAG laser) which is caused to interfere with itself by an appropriate interferometer system, by a silicon phase mask for example, as described in U.S. Pat. No. 5,351,321.

The fibre and in particular the core are thus exposed to a UV radiation of a periodically-varying intensity along the optical axis. In the core portions reached by the UV radiation a partial breaking of the Ge—O bonds occurs, which causes a permanent modification in the refractive index.

By selecting the grating pitch so to verify the constructive interference condition, the centre wavelength of the reflected band can be determined as desired.

By this technique, it is possible to produce filter gratings having a −3 dB reflected wavelength band typically of 0.2÷0.3 nm only, a reflectivity in the middle of the band up to 99%, a central wavelength of the reflected band that can be determined during the manufacturing step within about ±0.1 nm and a variation with temperature of the central wavelength of the reflected band as low as 0.02 nm/°C. In case a larger reflected band would be required, the grating can be made "chirped", that is with non constant pitch along its length.

The grating 24 transmits the pumping signal and reflects at least the emission signal that emanates from the doped substrate 26 back into the substrate and toward end 32. Thus, the index variation pitch of the fibre grating 24 is selected such that the grating reflects a wavelength corresponding to one of the peaks in the emission range of the erbium-doped lithium niobate crystal (for example, about 1550 nm).

For a laser that has single-mode, continuous wave operation, the fibre grating 24 also has a narrow bandwidth, preferably less than 1 nm. As a result, the grating 24 and the feedback element 38 define a cavity for the laser 20, whereby the emission signal oscillates between the two elements and through the doped substrate 26.

The optical fiber 24a, in which the grating 24 has been made, is affixed directly to the end 31 of the doped substrate as a pigtail, according to a technique known in the art, in a way to minimize interface reflections when light travels between them.

In a preferred embodiment, as schematically shown in FIG. 1, a ferrule 34, or an equivalent element, helps to secure the fibre including the grating 24 to the doped substrate 26, in optical connection with the waveguide 28.

In the following, the fiber 24a and the grating 24 included thereinto will be indicated, in short, as "grating 24".

This devices 34 provides stability for the coupling of the grating 24 with the waveguide 28.

The grating 24 may then be affixed with the waveguide 28 such that the waveguide and fibre end of the grating abut.

In particular, the coupling of the grating 24 with waveguide 28 is preferably made in the following manner.

The grating 24 is inserted into a corresponding seat in the ferrule 34 and positioned such that the end of the grating 24 and the end of the ferrule 34 align axially.

The two items are then secured together using a glue or other adhesive or securing composition or apparatus.

The end of the ferrule-fibre grating unit and the waveguide endface are then both polished before coupling them together.

Next, the ferrule-grating unit is positioned near the waveguide endface where the transmitted power between the waveguide and the grating is optimized, and the two endfaces are secured together using a transparent glue.

Typically, the insertion loss of such a connection between the fibre grating and the waveguide is 0.5 dB per interface.

Hence, the cavity defined by the grating 24 and the feedback element 38 comprises essentially the doped substrate 26 and the short portion of the optical fibre 24a included between the substrate end 31 and the fibre grating 24. The fiber 24a is then optically coupled with a fiber 44 of a WDM 41, for example by butt welding.

The oscillating emission within the laser cavity which will escape from the grating will pass through fibre 44 to the WDM 41. As discussed, WDM 41 will separate this desired emission signal and output the signal through fibre 42.

As can be seen, the configuration of laser 20 has several distinct advantages.

The simple structure of the doped lithium niobate crystal 26 and the fibre grating 24 permits an inexpensive and easy assembly for a laser cavity. Both components may be arranged together with a single optical connection between the fibre grating 24 and the waveguide 28, using the ferrule 34 or an equivalent pigtailing device.

Consequently, the laser cavity may be attached to the pigtail fibre 44 of a WDM 41 or removed as needed with little encumbrance.

Also, the use of a fibre grating 24 rather than a grating etched within the lithium niobate substrate greatly simplifies fabrication of the laser cavity.

Further, the laser configuration of FIG. 1 has much lower noise and pump signal loss than prior arrangements.

In particular, the laser cavity attached to pigtail fibre 44 of the WDM 41 has only one interface in its conducting medium, which occurs between fibre grating 24 and waveguide 28 of the substrate 26.

The connection between these waveguides is arranged to produce as little loss as possible, generally around 0.5 dB of attenuation, for signals passing across the interface.

The presence of a single interface is made possible due to the incorporation of feedback element 38 directly on the lithium niobate substrate 26.

Also, potential noise-inducing or signal-attenuating devices, such as WDM 41, are positioned outside the laser cavity.

As a result, the laser 20 of FIG. 1 has lower attenuation and lower noise than prior arrangements, which permits the use of a lower-powered laser diode pump source 22.

It should be noted that lower-powered laser diode pump sources are less-expensive and will provide higher reliability and longer operating life in comparison with higher powered ones.

Moreover, the laser 20 improves over prior arrangements in that it supplies two-way pumping to the gain medium of the doped substrate 26.

As mentioned, the pump signal from laser diode 22 passes into the doped substrate 26 via end face 31. The pump signal then travels through the doped medium of the lithium niobate crystal and causes lasing and stimulated emission. The pump signal reflects off feedback element 38, preferably without leaving the doped substrate 26, and passes back through the substrate toward end 31. In doing so, the pump signal again passes through the gain medium of the substrate 26 and further stimulates lasing within the cavity.

This two-way pumping of the cavity provides increased efficiency for the laser 20 and additionally enables the use of a lower-powered laser diode pump source 22. Because the reflective wavelength of the fibre grating 24 may fluctuate with temperature, thereby causing a corresponding fluctuation in the output wavelength of the laser 20, a container or package may house several or all of the components of the laser 20.

FIG. 9 illustrates a side view of a preferred packaging arrangement for laser 20. As shown in FIG. 9, the lithium niobate substrate 26 is mounted on a copper submount 102.

The submount forms the base for the fibre grating 24 as well, and thereby provides mechanical stability for the laser cavity between the grating 24 and the doped substrate 26.

A thermistor and Peltier element 104, positioned under the copper submount 102, monitor and control the temperature on the submount 102 to a stabilized, predetermined value.

Optimally, the thermistor and Peltier element stabilizes the cavity temperature to ±0.1° C.

Typically, a thermally-secure container 106 covers at least the doped substrate 26 and the fibre grating 24, as well as the submount 102 and thermistor and Peltier element 104.

Additionally, the laser container 106 housing the laser cavity may be inserted into a larger package (not shown) that includes the WDM, pump source, and related electronic circuits that drive the pump source and the Peltier element.

In this way, the temperature surrounding the fibre grating 24 will remain stable despite the external environment in which the laser package is used, and the reflective wavelength for the grating will remain consistent.

Referring to FIG. 2, a variation of the first embodiment of the present invention comprises a laser, generally referred to at 30, that has a doped LiNbO$_3$ substrate with an end face 48 polished at an angle.

This angled end face 48 is the end of the substrate located opposite from the feedback element 38.

Likewise, the fibre grating 24 that optically couples with the end face 48 via ferrule 34 has a polished end that matches with the angle of the substrate end face 48. The angled cut of the end 48 and fibre grating 24 provides an optical connection without giving rise to detrimental reflections.

The angled end 48 thus avoids the need for adding an antireflective layer between the substrate end and the fibre grating 24 and achieves substantially the same result of minimizing reflections at the substrate-grating interface.

A typical angle in the lithium niobate substrate is about 6°, and a corresponding angle in the ferrule is about 8.5°; generally, these values can be selected to minimize the reflection and to provide optimal coupling, in dependance of the respective refractive indexes of the optical means to be optically connected together, according to principles known to the skilled in the art.

FIG. 3 illustrates a second embodiment of the present invention.

According to the second embodiment of the present invention, a laser, generally referred to as 40, comprises a laser diode 22, a fibre grating 24, a rare-earth doped LiNbO$_3$ substrate 26, and a wavelength division multiplexer (WDM) 41.

In this arrangement of FIG. 3, the WDM 41 is coupled to the end 32 of the doped substrate 26, rather than between the laser diode 22 and the fibre grating 24 as shown in FIG. 1.

The WDM 41 of laser 40 is coupled to the doped substrate end 32 by way of optical fibre 46.

The fibre 46 and waveguide 28 are optically connected together using a pigtailing means including a ferrule 36, or an equivalent device.

As discussed above with reference to the ferrule 34, used for the connection between the waveguide 28 and the fibre grating 24, the ferrule 36 is adhered to the lithium niobate crystal 26 and secures fibre 46 and waveguide 28 in abutment with substantial axial alignment, to provide suitable optical connection.

As with laser 20 of FIG. 1, laser 40 of FIG. 3 uses WDM 41, and specifically its output fibre 42, as the output to the overall laser.

WDM 41 separates in its output fiber 44 the residual pumping signal generated by laser diode 22 and received at fibre 46, from the emission signal also received at fibre 46 and outputted in fiber 42.

The laser 40 operates as follows.

Laser diode 22 generates a pump signal of a selected wavelength and power that is characteristic of the rare-earth dopant in the lithium niobate crystal.

The pump signal travels through undoped optical fibre 23 and fibre grating 24 and enters the doped substrate 26 at end 31.

Ferrule 34 assists in securing a connection of abutment, and preferably physical contact, between the fibre grating 24 and waveguide 28, so as to provide a suitable optical coupling.

Substrate end 31 includes a nonreflective coating 39 that assists in minimizing any interface reflections across the grating-substrate interface.

The pump signal passes through doped substrate 26 and excites the gain medium to lase at stimulated emission wavelength.

A feedback element 38, described above for laser 20, formed on substrate end 32, reflects both the stimulated emission and the pump signal back through the gain medium for additional stimulation of the gain medium.

The feedback element 38 preferably comprises a partially reflective mirror or a similar wavelength-selective feedback element, capable of reflecting both the pumping wavelength and the emission wavelength.

The feedback element 38 can be made with a multi-layer coating of the endface 32 of the substrate 26, to provide the desired reflectivity, as already described before. The parts of the signal at the emission wavelength and of the residual pumping signal that are transmitted through feedback element 38 reach WDM 41 that, as explained, separates the two signals respectively towards output fibers 42 and 44. The fibre grating 24 is made in compliance with the already given equation $\lambda=2*n_{eff}*\Lambda$, such that the emission wavelength $\lambda$ is selectively reflected back into the doped substrate.

As a result, the emission signal stimulated by the pump signal will oscillate between fibre grating 24 and feedback element 38, which two elements define the cavity for laser 40.

The lithium niobate DBR laser of FIG. 3 thereby exhibits some of the same enhanced properties of laser 20.

The arrangement of feedback element 38 on substrate end 32 permits two-way pumping of the gain medium of the lithium niobate crystal.

As well, the compact design having no devices positioned within the laser cavity helps to minimize laser noise and raise efficiency.

As a result, the configuration for laser 40 enables the use of a lower-powered laser diode 22 to achieve lasing in the doped lithium niobate crystal.

An experiment was performed using the arrangement depicted in FIG. 3, with the exception that substrate end 32 and WDM 41 were coupled together using a lens system rather than a fibre pigtailing system.

In this setup, the erbium doped lithium niobate crystal substrate was butt-coupled with a fiber grating, having a peak of reflectivity at 1546.9 nm.

The erbium doped lithium niobate substrate was a z-cut lithium niobate crystal about 60 mm long. 5 mm large and 1 mm thick; erbium doping was with the deposition of a 15 nm thick erbium layer using electron beam evaporation, followed by a diffusion treatment for about 100 hours at 1100° C., to provide a superficial erbium concentration of about $10^{20}$ atoms/cm$^3$.

A waveguide was subsequently made in the substrate by photolitographic definition of a Ti stripe 6 μm wide and 120 nm thick, followed by a diffusion treatment for about 9 hours at 1030° C. 1/e$^2$ mode field diameter of the waveguide was 10.98×8.08 μm in TE polarization and 8.31×6.47 μm in TM polarization. Cut-off wavelength was 1370 nm and 1220 nm for TM and TE polarizations respectively.

The feedback element 38 in the test arrangement comprised a partially-reflecting mirror of the dielectric multilayer type.

The laser modes were detected using a Fabry-Perot interferometer with a 7.5 GHz spectral range.

The results of this experiment confirmed the operation of the DBR laser in a single longitudinal mode.

The following results were obtained:

| | |
|---|---|
| Emission signal wavelength: | 1546.9 nm |
| Operating threshold of laser: | 40.2 mW |
| Laser efficiency: | 2.5% |

Referring to FIG. 4, a variation of the second embodiment of the present invention comprises a laser generally referred to at 50 that has a doped LiNbO$_3$ substrate with an end 48 polished at an angle. This angled end 48 is the end of the substrate located opposite from the feedback element 38. Likewise, the fibre grating 24 that couples with the end 48 via ferrule 34 has a correspondingly polished end that matches with the angle of the substrate end 48 (the relevant refractive indexes of the two materials having been taken into account).

The polishing of the end face 48 and fibre grating 24 provides an optical connection without giving rise to detrimental reflections.

The angled end 48 thus can avoid the need for adding an antireflective coating between the substrate end and the fibre grating 24 and achieves substantially the same result of minimizing reflections at the substrate-grating interface.

In accordance with the present invention, a third embodiment of the present invention comprises a laser diode, a rare-earth doped lithium niobate substrate, two fibre gratings, and a wavelength division multiplexer (WDM).

As embodied herein and generally referred to at 60 in FIG. 5, the laser includes a laser diode pump source 22 coupled to a rare-earth doped lithium niobate crystal 26 via an undoped optical fibre 23.

In contrast to previous embodiments, the embodiment of laser 60 has the doped substrate 26 positioned between the laser diode 22 and fibre grating 24. In addition, substrate end 32 and feedback element 38 face the pump source 22 and receive the pumping signal therefrom.

Laser 60 in FIG. 5 operates as follows.

Laser diode source 22 generates pumping energy that travels along optical fibre 23, through feedback element 38 and enters waveguide 28 of the doped substrate 26.

As with previous embodiments, the connection with waveguide 28 preferably occurs by way of pigtailing means including a ferrule 36 and abutment of fibre 23 with waveguide 28.

The pump signal travels through waveguide 28, stimulating emission from the gain medium within the doped substrate 26.

Substrate end 31 includes an antireflective coating or surface 39 that minimizes reflections and noise as light crosses the substrate border. The pumping energy exits the doped substrate 26 at end 31 and passes through a first fibre grating 24 to second fibre grating 62.

The second fibre grating 62 is made in a known fashion such that the device 62 selectively reflects the pumping signal back toward the doped substrate 26. The pumping signal enters the doped substrate again through end 31 and thereby makes a second pass through the gain medium of the crystal.

Feedback element 38 of the present invention reflects the emission stimulated by the pump signal in laser 60 back into the doped substrate 26.

Feedback element 38 for this embodiment is preferably a wavelength-selective device, such as a multi-layer reflective coating of the type described before, positioned at the end of the substrate 26, that has low reflectivity for the pumping wavelength and high reflectivity for the emission wavelength.

In particular, a wavelength-selective feedback element which has, for example, a reflectivity of 99% at the emission wavelength of 1550 nm and a reflectivity of 10% a pumping wavelength of 1480 nm, may be made of 23 alternating layers of SiO$_2$ and TiO$_2$ of about 290 nm and 202 nm thickness respectively.

The feedback element 38 reflects the emission signal stimulated by the pumping signal.

Fibre grating 24, affixed to the substrate end 31 and to the second fibre grating 62, is designed so that it selectively reflects a selected wavelength of the stimulated emission of the lithium niobate dopant.

As a result, the emission within the doped substrate 26 will reflect off the feedback element 38 within the substrate and the fibre grating 24 outside the substrate and oscillate in between these surfaces. Thus, the feedback element 38 and the fibre grating 24 define the cavity for laser 60.

WDM 41 in laser 60 is connected through its input port 46 to the second fibre grating 62.

The WDM 41 will receive some of the emission signal and the pumping signal on fibre 46 and will separate the emission signal to line 42 and the pumping signal to line 44.

Output fiber 42 in laser 60 functions as the overall output for the laser.

Laser 60 provides a laser configuration that enables two-way pumping of the laser cavity with low noise and reflections. As with previously discussed embodiments, laser 60 benefits from the single interface at substrate end 31 within the laser cavity.

A high coupling efficiency and low loss across this interface provides laser 60 with low noise and reflections and yet allows inexpensive and easy fabrication of the grating in an optical fibre, as shown at 24.

Referring to FIG. 6, a variation of the third embodiment of the present invention comprises a laser generally referred to at 70 that has a doped LiNbO$_3$ substrate with an end face 48 polished at an angle.

This angled end face 48 is the end of the substrate located opposite from the feedback element 38.

Likewise, the fibre grating 24 that couples with the end face 48 via ferrule 34 has a cleaved end that matches with the angle of the substrate end face 48.

The angled polishing of the end face 48 and fibre grating 24 provides an optical connection without substantially giving rise to detrimental reflections.

The angled end face 48 thus may avoid the need for adding an antireflective coating between the substrate end face and the fibre grating 24 and achieves substantially the same result of minimizing reflections at the substrate-grating interface.

According to the present invention, each of the above-described preferred embodiments may further include additional elements as required to optimize the performance or simplicity of the invention, and to provide extra functionalities.

In particular, lasers 20, 30, 40, 50, 60, or 70 may include an intracavity modulator in the LiNbO$_3$ substrate.

Referring to FIG. 7, as an example, a laser 80 includes a laser pump source 22, a WDM 41, a lithium niobate substrate 26 doped with a rare earth material such as erbium, and a fibre grating 24.

As previously discussed, an optical waveguide 28 passes a pumping signal and an emission signal through the doped substrate 26.

A feedback element 38, such as a mirror or other reflective element or treatment, reflects the pump wavelength back through the doped substrate 26. The configuration of FIG. 7, however, also utilizes the excellent electro-optical properties of LiNbO$_3$ for a monolithic integration of an intracavity phase modulator for FM mode-locking.

The laser 80 of FIG. 7 illustrates a configuration of the present invention that achieves FM mode-locking using an intracavity phase modulator.

The phase modulator generally referred to at 82 is integrally formed in the LiNbO$_3$ substrate.

In the illustrated embodiment, the substrate is made of a x-cut LiNbO$_3$ crystal and the phase modulator 82 comprises electrodes 84 and 86 positioned on opposite sides of waveguide 28, which extends through the doped substrate 26.

Electrode 86 is connected with ground in a known manner.

A sinusoidal signal from, for example, an RF signal generator (not shown), drives the intracavity phase modulator 82 through electrode 84.

The sinusoidal signal has a frequency equal to the free spectral range of the laser cavity, or a harmonic thereof. This selected frequency will achieve mode-locking for a single circulating optical pulse in the cavity, or a number of pulses equal to the number of harmonics of the sinusoidal frequency.

The pulse generated by the laser 80 when operating in a mode-locking regime is transform limited, where the pulse (duration * bandwidth)=0.442.

As a result, any variation in the spectral bandwidth of the emission signal causes a corresponding change in the pulse duration. That is, if the spectral bandwidth of the emission signal increases (decreases), the duration of the mode-locking pulse correspondingly decreases (increases).

In the configuration of FIG. 7, the fibre grating 24 has a predetermined bandwidth as a feedback element for the laser 80, preferably less than 1 nm. With a fixed emission wavelength, it is therefore possible to reduce the spectral content of the optical pulse in the cavity and cause an enlargement of the time duration of the pulse. By discriminately selecting the characteristics of fibre grating 24 for a desired bandwidth, a fixed and determinable pulse duration for the mode-locked laser can be obtained.

In accordance with a further embodiment of the present invention, a laser generally referred as 90 in FIG. 8 includes a laser pump source 22, a WDM 41, a lithium niobate substrate 26 doped with a rare earth material such as erbium, and a fibre grating 24.

The configuration of FIG. 8, however, also utilizes the excellent electro-optical properties of LiNbO$_3$ for a monolithic integration of an intracavity amplitude modulator for AM mode-locking.

The amplitude modulator, generally referred to at 92 in FIG. 8, is integrally formed in the LiNbO$_3$ substrate and includes electrodes 94, 96, and 98.

In this arrangement, a section of the straight waveguide within the lasing cavity is replaced with a Mach Zehnder modulator.

Electrodes 94 and 98 are connected to ground, as shown in the schematic drawing of FIG. 8.

As with the phase modulator in FIG. 7, a sinusoidal signal from, for example, an RF signal generator (not shown) drives the amplitude modulator in FIG. 8.

The signal generator drives the sinusoidal signal through electrode 96.

The sinusoidal signal has a frequency equal to the free spectral range of the laser cavity, or a harmonic thereof.

This frequency will achieve AM mode-locking with a single circulating optical pulse in the cavity, or a number of pulses equal to the number of harmonics of the frequency.

As with the phase modulator for FM mode-locking, if the spectral bandwidth of the emission signal increases (decreases), the duration of the mode-locking pulse with the amplitude modulator correspondingly decreases (increases).

In the configuration of FIG. 8, the fibre grating 24 has a predetermined bandwidth as a reflective element for the laser 90, preferably less than 1 nm. By discriminately selecting the characteristics of fibre grating 24 for a desired bandwidth, a fixed and determinable pulse duration for the mode-locked laser 90 can be attained. Hence, optimizing the spectral width of the fibre grating will assist in optimizing the width of pulses circulating in the cavity.

In the preceding description the substrate in which the waveguide is made was described making reference to its preferred embodiment, where a lithium niobate substrate is used; however, it is apparent to the skilled in the art that other substrates can be used to make a laser, if appropriate.

In particular, other electro-optic materials can be used, such as lithium tantalate or lithium iodate or electro-optic polymers.

In addition, in case electro-optic properties were not required in a specific application, other materials dopable with lasing ions can be used, such as SiO$_2$ or other glass compositions, without departing from the present invention.

It will be apparent to those skilled in the art that various modifications and variations can be made to the present invention without departing from the spirit or scope of the invention.

For example, the intracavity phase modulator of FIG. 7 and the intracavity amplitude modulator of FIG. 8 shown for the laser arrangement of FIG. 2 may equivalently be applied to the other laser arrangements described before, i.e. those shown in FIGS. 1 and 3 to 6.

Thus, it is intended that the present invention covers any modifications and variations provided they come within the scope of the appended claims and their equivalents.

We claim:

1. A laser, comprising:

a substrate doped with a lasing material, the doped substrate having first and second ends and including a wavelength for passing a pumping light and a stimulated emission signal between the ends, and a feedback element at said first end for reflecting at least a portion of the emission signal toward the second end; and a grating reflector having an input optically coupled with the waveguide at the second end of the doped substrate and an output, the grating reflector and the feedback element defining a laser cavity including the doped substrate, characterized in that the grating reflector is an optical fibre modified to provide a grating reflector for the emission signal and reflects at least a portion of the emission signal toward the first end of the doped substrate and in that the reflectivities of said feedback element and of said grating reflector for said emission signal are selected to provide emission signal amplification by lasing when pumping light is supplied to said waveguide.

2. The laser of claim 1, characterized in that it further comprises a pump source coupled to the output of the grating reflector, the pump source driving pumping light through the grating reflector and then into the doped substrate.

3. The laser of claim 2, characterized in that it further comprises optical separation means interposed between the pump source and the grating reflector, the optical separation means separating the emission signal from other signals received from the pump source and the grating reflector.

4. The laser of claim 2, characterized in that it further comprises a wavelength division multiplexer optically coupled to the first end of the doped substrate, the wavelength division multiplexer separating the emission signal from other signals received from the feedback element.

5. The laser of claim 3, characterized in that said optical separation means is a wavelength division multiplexer.

6. The laser of claim 3, characterized in that said optical separation means is an optical circulator.

7. The laser of claim 1, characterized in that said substrate is an electro-optic material.

8. The laser of claim 1, characterized in that said substrate is lithium niobate.

9. The laser of claim 1, characterized in that said lasing material includes at least a rare earth element.

10. The laser of claim 1, characterized in that said feedback element reflects at least a portion of both the emission signal and the pumping light toward the second end of the substrate.

11. A laser, comprising:

a substrate doped with a lasing material, the doped substrate having first and second ends and including a waveguide for passing a pumping light and a stimulated emission signal between the ends, the first end including a feedback element for reflecting at least a portion of the emission signal toward the second end; and a grating reflector having an input optically coupled with the waveguide at the second end of the doped substrate and an output, the grating reflector and the feedback element defining a laser cavity including the doped substrate, characterized in that the grating reflector is formed from an optical fibre portion and reflects at least a portion of the emission signal toward the first end of the doped substrate and in that at least the doped substrate and the grating reflector are housed in a thermally stable package.

12. A laser, comprising:

a substrate doped with a lasing material, the doped substrate having first and second ends and including a waveguide for passing a pumping light and a stimulated emission signal between the ends, the first end including a feedback element for reflecting at least a portion of the emission signal toward the second end; and a grating reflector having an input optically coupled with the waveguide at the second end of the doped substrate and an output, the grating reflector and the feedback element defining a laser cavity including the doped substrate, characterized in that the grating reflector is formed from an optical fibre portion and reflects at least a portion of the emission signal toward the first end of the doped substrate and that the optical coupling between the grating reflector and the second end of the doped substrate causes a loss to pumping light of less than 1 dB.

13. A laser, comprising:

a substrate doped with a lasing material, the doped substrate having first and second ends and including a waveguide for passing a pumping light and a stimulated emission signal between the ends, the first end including a feedback element for reflecting at least a portion of the emission signal toward the second end; and a grating reflector having an input optically coupled with the waveguide at the second end of the doped substrate and an output, the grating reflector and the feedback element defining a laser cavity including the doped substrate, characterized in that the grating reflector is formed from an optical fibre portion and reflects at least a portion of the emission signal toward the first end of the doped substrate and in that said feedback element comprises a plurality of layers of dielectric material deposited on the first end of said doped substrate.

14. The laser of claim 1, characterized in that the second end of the doped substrate is coated with an antireflective coating.

15. A laser, comprising:

a substrate doped with a lasing material, the doped substrate having first and second ends and including a waveguide for passing a pumping light and a stimulated emission signal between the ends, the first end including a feedback element for reflecting at least a portion of the emission signal toward the second end; and a grating reflector having an input optically coupled with the waveguide at the second end of the doped substrate and an output, the grating reflector and the feedback element defining a laser cavity including the doped substrate, characterized in that the grating reflector is formed from an optical fibre portion and reflects at least a portion of the emission signal toward the first end of the doped substrate and in that the second end of the doped substrate is polished at an angle less than 90° to the direction between the first end and the second end.

16. The laser of claim 1, characterized in that it further comprises a pump source coupled to the first end of the doped substrate and the doped substrate is disposed between the pump source and the grating reflector, the pump source driving pumping light through the feedback element, the doped substrate, and then to the grating reflector.

17. The laser of claim 15, characterized in that it further comprises a wavelength division multiplexer coupled to the output of the grating reflector, the wavelength division multiplexer separating the emission signal from other signals received from the grating reflector.

18. The laser of claim 1, characterized in that the emission signal corresponds to single-mode, continuous-wave operation for the laser.

19. The laser of claim 1, characterized in that the grating reflector has a bandwidth less than 1 nm.

20. The laser of claim 7, characterized in that it further comprises a phase modulator integrated in the doped substrate, the phase modulator providing FM mode-locking operation for the laser.

21. The laser of claim 7, characterized in that it further comprises an amplitude modulator integrated in the doped substrate, the amplitude modulator providing AM mode-locking operation for the laser.

22. A laser, comprising:

a pump source for generating a pumping light;

a substrate of lithium niobate doped with at least one rare earth element, the doped substrate including a waveguide for passing the pumping light and a stimulated emission signal through the doped substrate;

first means, contacting the waveguide, for reflecting a first group of selected wavelengths passing from the waveguide back through the waveguide, the first group including at least the emission signal;

second means, contacting the waveguide, for reflecting a second group of selected wavelengths passing from the waveguide back through the waveguide, the doped substrate being positioned between the first and second reflecting means, the second group including at least the pumping signal; and a grating reflector having an input coupled to the second reflecting means and an output, the grating reflector being formed from portions of an optical fibre and reflecting at least the emission signal passing from the second reflecting means back toward the waveguide, the grating reflector and the first reflecting means defining a cavity for the laser.

23. The laser of claim 22, characterized in that it further comprises a thermally-stable package housing at least the doped substrate and the grating reflector.

24. The laser of claim 22, characterized in that the grating reflector is positioned between the second wavelength-selective reflector and the doped substrate, the input of the grating reflector being optically coupled to the second end of the doped substrate.

25. The laser of claim 24, characterized in that it further comprises a wavelength division multiplexer coupled to the second wavelength-selective reflector, the wavelength division multiplexer separating the emission signal from other signals received from the feedback element.

26. The laser of claim 22, characterized in that the second wavelength-selective reflector is positioned between the grating reflector and the doped substrate, the second wavelength-selective reflector abutting the second end of the doped substrate.

27. The laser of claim 26 characterized in that it further comprises a wavelength division multiplexer coupled to the output of the grating reflector, the wavelength division multiplexer separating the emission signal from other signals received from the feedback element.

28. The laser of claim 22, characterized in that the emission signal corresponds to single-mode, continuous-wave operation for the laser.

29. The laser of claim 22, characterized in that the grating reflector has a bandwidth less than 1 nm.

30. The laser of claim 29, characterized in that it further comprises a phase modulator integrated in the doped substrate, the phase modulator providing FM mode-locking operation for the laser.

31. The laser of claim 29, characterized in that it further comprises an amplitude modulator integrated in the doped substrate, the amplitude modulator providing AM mode-locking operation for the laser.

32. A laser, comprising:

a pump source for generating a pumping light;

a substrate of lithium niobate doped with at least one rare earth element, the doped substrate including a waveguide for passing the pumping light and a stimulated emission signal through the doped substrate;

a first wavelength-selective reflector contacting the waveguide for reflecting a first group of selected wavelengths passing from the waveguide back through the waveguide, the first group including at least the emission signal;

a second wavelength-selective reflector contacting the waveguide for reflecting a second group of selected wavelengths passing from the waveguide back through the waveguide, the doped substrate being positioned between the first and second wavelength-selective reflectors, the second group including at least the pumping signal;

a first grating reflector having an input coupled to the second wavelength-selective reflector and an output; and a second grating reflector having an input coupled to the output of the first grating reflector, the first and second grating reflectors being formed from portions of optical fibres, one of the first and second grating reflectors reflecting the emission signal passing from the second wavelength-selective reflector back toward the waveguide, another of the first and second grating reflectors reflecting the pumping signal passing from the second wavelength-selective reflector back toward the waveguide, the first wavelength-selective reflector and said one of the first and second grating reflectors defining a cavity for the laser.

33. The laser of claim 32, characterized in that the grating reflector has a bandwidth less than 1 nm.

34. The laser of claim 33, characterized in that it further comprises a phase modulator integrated in the doped substrate, the phase modulator providing FM mode-locking operation for the laser.

35. The laser of claim 33, characterized in that it further comprises an amplitude modulator integrated in the doped substrate, the amplitude modulator providing AM mode-locking operation for the laser.

* * * * *